(12) United States Patent
Angoulvant et al.

(10) Patent No.: US 10,965,539 B2
(45) Date of Patent: Mar. 30, 2021

(54) SYSTEM AND METHOD FOR DISTRIBUTED TESTING OF END-TO-END PERFORMANCE OF A SERVER

(71) Applicant: AirMagnet, Inc., Santa Clara, CA (US)

(72) Inventors: Antoine Angoulvant, Rockville, MD (US); Daniel Ryan Boxler, Colorado Springs, CO (US); Ross Daniel Nordstrom, Colorado Springs, CO (US)

(73) Assignee: AirMagnet, Inc., Santa Clara, CA (US)

( * ) Notice: Subject to any disclaimer, the term of this patent is extended or adjusted under 35 U.S.C. 154(b) by 272 days.

(21) Appl. No.: 15/718,865

(22) Filed: Sep. 28, 2017

(65) Prior Publication Data

US 2019/0097893 A1 Mar. 28, 2019

(51) Int. Cl.
*H04L 12/24* (2006.01)
*H04L 12/26* (2006.01)
*H04L 29/08* (2006.01)

(52) U.S. Cl.
CPC ............ *H04L 41/145* (2013.01); *H04L 43/50* (2013.01); *H04L 41/0273* (2013.01); *H04L 67/02* (2013.01); *H04L 67/06* (2013.01); *H04L 67/28* (2013.01)

(58) Field of Classification Search
CPC ............ G06F 11/3006; G06F 11/3058; G06F 11/3086; G06F 11/323; G06F 11/3409; G06F 11/3495; G06F 16/156; H04L 41/08; H04L 43/50
See application file for complete search history.

(56) References Cited

U.S. PATENT DOCUMENTS

| | | | |
|---|---|---|---|
| 9,203,931 B1* | 12/2015 | Ngo | H04L 67/28 |
| 2003/0182424 A1* | 9/2003 | Odendahl | G06F 16/957 709/225 |
| 2018/0351829 A1* | 12/2018 | Buriano | H04L 43/50 |
| 2018/0364975 A1* | 12/2018 | Kwong | G06F 3/04847 |
| 2018/0367941 A1* | 12/2018 | Kwong | H04L 43/50 |

* cited by examiner

*Primary Examiner* — Hitesh Patel
(74) *Attorney, Agent, or Firm* — Locke Lord LLP; Scott D. Wofsy; Christopher J. Capelli

(57) ABSTRACT

A system and computer-implemented method to test end-to-end performance of a server, wherein the method includes transmitting from a processing device of a remote test system, to at least one monitor device, a proxy-based test for execution by the at least one monitor device to emulate end-user communication using a protocol via one or more networks with a web-based server coupled to the at least one monitor device. The method further includes receiving by the processing device, from the at least one monitor device, responses by the web-based server to the proxy-based test, and performing by the processing device automated web application testing to measure characteristics of communication between the at least one monitor device and the web-based server, the communication including user-emulated messages from the at least one monitor device executing the proxy-based test to the web-based server and corresponding responses from the web-based server.

17 Claims, 5 Drawing Sheets

SYSTEM AND METHOD FOR DISTRIBUTED TESTING OF END-TO-END PERFORMANCE OF A SERVER

FIELD OF THE INVENTION

The present technology relates to distributed testing of end-to-end performance of a server using a server-based protocol.

BACKGROUND OF THE INVENTION

In a network configuration, a server using a particular protocol can provide a service to user devices, such as portable computing devices (e.g., smart phones, tablets, and laptops) or stationary computing devices (such as desktop computers or computer terminals). The quality of experience (QoE) of an end user is of great concern to all parties involved of provision of the service.

However, conventional network monitoring is limited to measuring aspects of performance and availability of servers and networks, without the ability to measure end-to-end performance of a service provided by the server using a server-based protocol from a user perspective, including availability of network resources. In conventional monitoring, one or more monitoring devices may be distributed about the network, each have limited computing resources. Measurements performed by a single monitoring device are limited due to reliance on limited computing resources of the monitoring device, limiting the ability of the monitoring device to monitor multiple external dependencies of a network resource provided by a server or availability of the network resource that may affect QoE of an end user. This further limits the ability of the single monitoring device to measure end-to-end performance of a service provided by the server.

Such conventional methods and systems have generally been considered satisfactory for their intended purpose. However, there is still a need in the art for a method to increase the computing resources of one or more network monitoring devices to increase the ability to monitor QoE of an end user using a service provided by a server and end-to-end performance of the service.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, disclosed is a computer-implemented method to test end-to-end performance of a server, wherein the method includes A system and computer-implemented method to test end-to-end performance of a server, wherein the method includes transmitting from a processing device of a remote test system, to at least one monitor device, a proxy-based test for execution by the at least one monitor device to emulate end-user communication using a protocol via one or more networks with a web-based server coupled to the at least one monitor device. The method further includes receiving by the processing device, from the at least one monitor device, responses by the web-based server to the proxy-based test, and performing by the processing device automated web application testing to measure characteristics of communication between the at least one monitor device and the web-based server, the communication including user-emulated messages from the at least one monitor device executing the proxy-based test to the web-based server and corresponding responses from the web-based server.

In accordance with another aspect of the disclosure, a test system is provided to test end-to-end performance of a server. The system includes a memory configured to store instructions and a processor disposed in communication with the memory. The processor upon execution of the instructions is configured to perform the operations of the method.

In accordance with still another aspect of the disclosure, a non-transitory computer readable storage medium and one or more computer programs embedded therein are provided. The computer programs include instructions, which when executed by a computer system, cause the computer system to perform the operations of the method.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
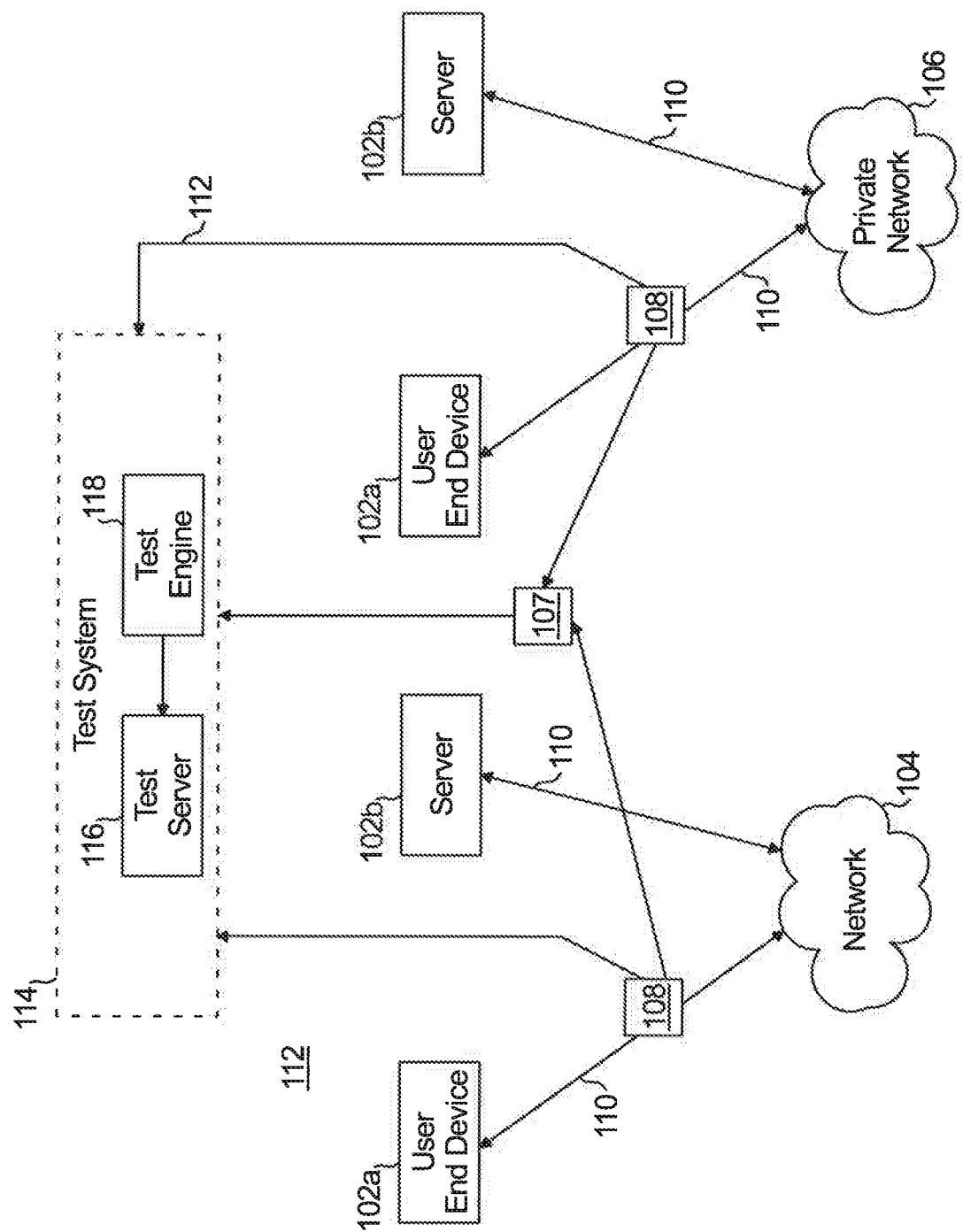
FIG. 1 illustrates a block diagram of an example network monitoring system, in accordance with an illustrative embodiment of the present disclosure.

Reference will now be made to the drawings wherein like reference numerals identify similar structural features or aspects of the subject disclosure. For purposes of explanation and illustration, and not limitation, a block diagram of an exemplary embodiment of a network monitoring system in accordance with the disclosure is shown in FIG. 1 and is designated generally by reference character 100. Other embodiments of the network monitoring system 100 in accordance with the disclosure, or aspects thereof, are provided in FIGS. 2-5, as will be described.

A network monitoring system is provided that provides for distributed testing of end-to-end performance of a server using a server-based protocol. One or more monitor devices are distributed at one or more different interfaces of one or more networks. Each monitor device is coupled via the one or more networks to one or more web-based servers. A testing system can select one or more of the monitor devices. The testing system transmits to each of the selected monitor devices a proxy-based test for execution by the monitor device. The monitor devices, acting as proxy servers, can execute the proxy-based test to emulate end-user communication using a selected protocol of one or more protocols via the one or more networks with the one or more web-based servers. In embodiments, the monitor devices executing the proxy-based test also measure multiple characteristics associated with the end-user emulated communication between the end-user and the one or more web-based servers. The testing device can receive these measurements from the selected monitor devices. The testing device executes a web driver and uses the web driver to perform automated web application testing to process the measurements of the multiple characteristics received from the selected monitor devices.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth. It is to be appreciated the embodiments of this disclosure as discussed below are implemented using a software algorithm, program, or code that can reside on a computer useable medium for enabling execution on a machine having a computer processor. The machine can include memory storage configured to provide output from execution of the computer algorithm or program.

As used herein, the term "software" is meant to be synonymous with any logic, code, or program that can be executed by a processor of a host computer, regardless of whether the implementation is in hardware, firmware or as a software computer product available on a disc, a memory storage device, or for download from a remote machine. The embodiments described herein include such software to implement the equations, relationships, and algorithms described above. One skilled in the art will appreciate further features and advantages of the disclosure based on the above-described embodiments. Accordingly, the disclosure is not to be limited by what has been particularly shown and described, except as indicated by the appended claims.

Description of certain illustrated embodiments of the present disclosure will now be provided. With reference now to FIG. 1, network system 100 includes one or more networks 104 and 106 that are monitored by monitor devices 108 and a test system 114. In the example shown, the networks include a public network 104 and a private network 106, without limitation to specific number or type of private or public network. A plurality of end user devices 102a and servers 102b, referred to collectively as end devices 102, are coupled to at least one of public network 104 and private network 106 via data links 110. These data links 110 can be wireless links, wired links, or a combination thereof.

The end devices 102 communicate with other end devices 102 that are coupled to the same or a different network 104 and/or 106 via the networks 104 and/or 106. In particular, a user end device 102a communicates with a server 102b via the networks 104 and/or 106. A user end device 102a is a source or destination of a communication sent via networks 104 and/or 106 that interfaces between a user and a network 104 or 106. Examples of user end devices 102a include mobile computing devices (e.g., smart phones, tablets, or laptop computers), desk top computers, computer terminals, web-connected machines or consumer devices, web-connected sensors, point-of-sale (POS) terminals, machines on manufacturing assembly lines, etc.

The servers 102b can be, for example, web servers, application servers, communication servers, banking servers, securities trading servers, etc. A webserver is a computer system that processes requests via Hypertext Transfer Protocol (HTTP), to serve the files that form Web pages to users, in response to their requests, such as for web browsing or providing single page applications (SPAs). An application server can provide a service to end devices 102. Examples of application servers include media servers for providing a media service (e.g., streaming video or audio); voice over internet servers for providing voice over internet services; data analysis servers for collecting and analyzing data from e.g., sensors; configuration servers for (re-)configuring an end device; and transaction servers for processing a transaction. Examples of such transactions include, for example and without limitation, retail purchases, banking transactions, and securities transactions. A communication server can be an open, standards-based computing system that operates as a carrier-grade common platform for a wide range of communications applications, such as to transfer files or access information on systems or networks at remote locations over telecommunication links.

Examples of protocols supported by servers 102b include WebEx® protocols, Oracle® database protocols, virtual network computing (VNC®) screensharing protocols, video streaming protocols, performance (e.g., round trip time) testing protocols, etc. In the current example described below, the server 102b is a web server that uses HTTP to serve web pages to clients as SPAs.

The public network 104 can include, for example, a network such as the Internet, a different public network, a cellular network, a public switched telephone network (PSTN), a wired network, a wireless network, etc. The private network 106 can include, for example, a personal communication service (PCS) network, a wired network, and a wireless network, etc. The networks 104 and 106 each include network nodes (not shown) that facilitate operation of the networks 104 and 106 by handling network data, such as for routing traffic through the network 104 and/or performing security or monitoring operations associated with the network traffic.

The monitor devices 108 can be distributed about the networks 104 and/or 106. FIG. 1 shows an embodiment in which the monitor devices 108 are disposed along data links 110 that link the user end devices 102a to the networks 104 and/or 106. It is to be understood that in embodiments, the monitor devices 108 can be disposed at, or integrated with, interfaces of the networks 104 that connect network nodes, network nodes, and/or the end devices 102 to intercept live packets flowing via networks 104 and/or 106. The network nodes can be, for example, network devices, such as routers or taps. The term "live packet," as used herein, means that the packet is included in an actual stream of end-to-end network traffic and is en route between end devices 102.

One or more aggregation devices 107 can aggregate data, such as flow summaries and traffic records, from one or more monitor devices 108 and provide the aggregated data to the test system 114. In embodiments, the monitor devices 108 or the test system 114 can be integrated with an aggregation device 107. The output from the monitor devices 108 and the aggregation devices 107 is referred to collectively as intercept data.

The monitor devices 108 and aggregation devices 107 can include hardware, firmware, and/or software components that are configured to monitor or aggregate network traffic. Monitoring can include, for example, measuring, intercepting, capturing, copying, or inspecting a network traffic packet, flow, or stream. Monitor devices 108 and aggregation devices 107 can include central or distributed elements for performing tasks associated with the monitoring. The monitor devices 108 can be passive or active and include, for example distributed or centralized network devices, such as routers, switches, taps, port mirrors, and probes that acquire and/or collect flow summaries. These elements can be positioned inline, and/or remote relative to end devices 102 and communication links 110.

In embodiments, software modules of the monitor devices 108 and aggregation devices 107 can include software agents. In embodiments, the monitor devices 108 and aggregation devices 107 can be physical or virtual devices that are physically remote relative to end devices 102 and the data links 118. Whether implemented as a physical or virtual device, the monitor devices 108 and aggregation devices 107 use firmware or a hardware processing device that executes software instructions, which enables performance of the disclosed functions.

The monitor devices 108 and aggregation devices 107 can be located remotely from one another and can further be located remotely from the test system 114. Intercept data output by the monitor devices 108 and/or aggregation devices 107 is transmitted to the test system 114 via one or more data paths 112. Data paths 112 can include a bus and/or communication links, where the communication links of data paths 112 can be wireless, wired, or a combination thereof. In embodiments, data paths 112 can be included in a network.

Interception of a packet by a monitor device 108 refers to accessing the packet, such as to enable inspecting contents of the entire packet or portions of the packet. The monitor device 108 can make a copy of the packet or portions thereof, or store the packet or portions thereof. Additionally, the monitor device 108 can inspect the live packets. This inspection can be performed at the location at which the live packets were intercepted. Alternatively, the inspection can be performed by the aggregation device 107 or the test system 114. The inspection of the packets can include deep packet inspection, including inspection of contents of at least one of a header and footer of the packet. Inspection includes accessing and reading the contents so that the contents can be processed. When inspection indicates that the contents of the packet are encrypted, the monitor device 108, aggregation device 107 or test system 114 can decrypt encrypted portions of the contents.

The test system 114 receives intercept data from the monitor devices 108 or aggregation devices 107. Together, the monitor devices 108 and the test system 112 form a network monitor system (shown as network monitor system 200 in FIG. 2) that can monitor and process intercept data related to network communications transmitted via networks 104 and/or 106 from a user perspective. The test system 114 can further perform business analysis from the user perspective, such as to analyze quality of service (QoS), quality of experience (QoE), and/or network performance with regards to one or more selected users. Marketing analysis can analyze user behavior and characteristics, such as to profile users and provide analytical data of value to the business.

Each of monitor devices 108, aggregation devices 107, and test system 114 may be a special purpose computing device or a software component (not limited to a single process) dedicated to its corresponding functions related to monitoring data communicated via the networks 104 and/or 106. For example, monitor devices 108, the aggregation devices 107, and test system 114 can execute object oriented programs that define classes, which are non-modifiable once defined, thus forming a virtual machine. Objects are executed as instances of a class. The objects can be interactive objects that include attributes with quantifiable values and functions that are invoked by values. The values can be received as input or from other objects. Alternatively, each of monitor devices 108, the aggregation devices 107, and test system 114 may be a general purpose computing device with specialized software components installed thereon. In one embodiment, the monitor devices 108 are embodied as nGenius Probes, nGenius InfiniStream, or InfiniStream Next generation probes collectively called as ISNG probes available from NetScout Systems, Inc. of Westford, Mass. In embodiments the test system 114 is a computing device running Netscout nGenius Business Analytics (nBA) application software, available from NetScout Systems, Inc. of Westford, Mass.

Figure 2:
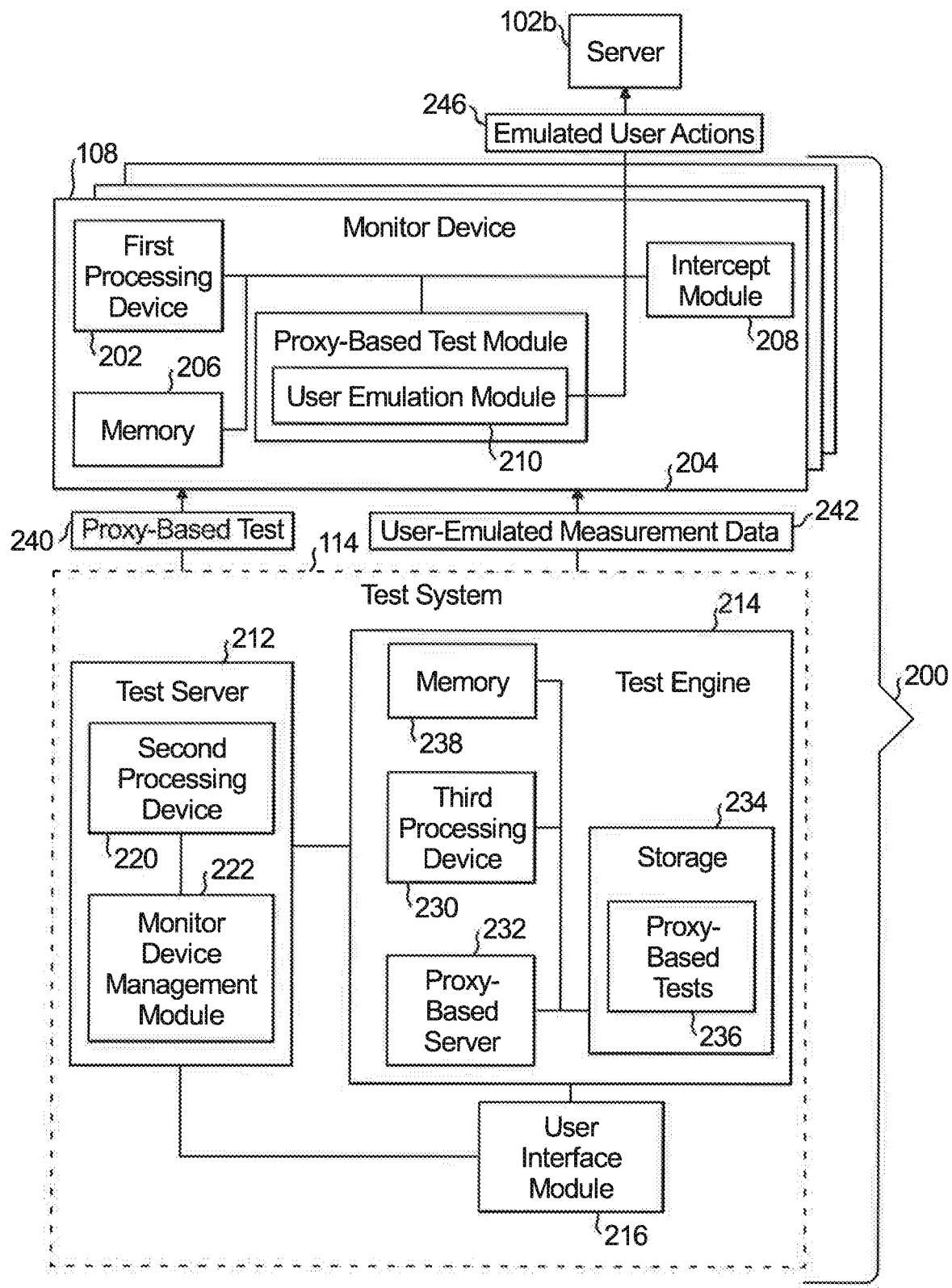
FIG. 2 illustrates an example test system of the network monitoring system shown in FIG. 1.

FIG. 2 shows a block diagram of an example network monitor system 200 that includes test system 114 and one or more monitoring devices 108. The monitor device 108 and test system 114 communicate with each other via wired or wireless communication.

In the example shown, the monitor devices 108 each include a first processing device 202, a proxy-based test module 204 having a user emulation module 210, a memory 206, and an intercept module 208. The proxy-based test module 204 is a software module that can be executed by the first processing device 202. The proxy-based test module 204, when executed, processes a proxy-based test 240 transmitted by the test system 114. This causes the proxy-based test module 204 to operate as a proxy server by performing a test defined by the proxy-based test 240 that controls the user emulation module 210e to transmit user-emulated actions to a particular server 102b.

The user-emulated actions can include, for example, emulated end-user communications, such as a variety of coordinated HTTP or FTP requests or responses that emulate user interaction with the server 102b that is executing an application. The emulation can be built upon HTTP requests and/or responses. For example, the user-emulated actions can be HTTP requests that emulate the rendering of and interaction with a web page. Other examples, without limitation thereto, of HTTP and non-HTTP requests that can be emulated for emulating user interactions with an application include form submissions, database queries, HTTP-based file upload and/or download requests, and requests for operations on files, such as file transfers using a file transfer protocol (FTP).

The user-emulated actions can further include user-emulated responses to messages received from the server 102b that is being tested, wherein the user-emulated responses are determined by the proxy-based test module 204 based on the proxy-based test 240.

In the context of testing a web server operating SPAs, the entity can be a webpage identified by the test that is an SPA, a traditional client-server web page, an HTTP-based service or application programming interface (API) (including, for example, REST, SOAP, and other protocols). In other contexts, the proxy based test 240 can be configured to test entities that use protocols other than HTTP, such as protocols used for media transmission (e.g., streaming video or audio), voice over internet, data analysis, configuration of end devices 102, and executing transactions.

In embodiments, the proxy based test 240 can verify operation of one or more selected external dependencies of the server 102b being tested. In the context of testing a webpage, such external dependencies can include user interface (UI) frameworks, stylesheets, and post-load data queries. The test can verify operation of external dependencies via user-provided assertions about the presence and/or absence of content and entities present in the rendered/queried content. Such assertions on test cases can be enforced sequentially, but can also be enforced simultaneously.

In embodiments, the monitor device 108 can obtain measurements associated with the server's 102b response to the user-emulated actions and provide the measurements to the test system 214. For example, the intercept module 208 can intercept network traffic that is responsive to the user-emulated actions 246 directed at the server 102b that is being tested. Intercept data intercepted during the test by the intercept module 208 can be transmitted to the test system 114 as user-emulated measurement data 242.

The memory 206 is a short term memory, such as volatile memory for temporary storage and quick access. Memory 206 can include random access memory (RAM), such as static RAM (SRAM) and/or dynamic RAM (DRAM), or the like, for storing the proxy-based test received, program data, and providing a working memory.

The intercept module 208 can include a configurable measuring device that can be configured by script having configuration instructions included in the proxy-based test. A configurable measuring device for measuring properties associated with a computing environment are described in U.S. patent application Ser. No. 15/069,736, which is incorporated by reference herein in its entirety. The measuring device can be configured to perform operations, such as detecting and/or measuring at least one property and outputting corresponding measurement data. A property being measured can include, for example, a physical property (e.g., temperature, current, pressure, etc.) or a characteristic of data (e.g., data content, network traffic metrics, etc.) or a characteristic of the computing environment (e.g., memory usage, CPU utilization, wireless interference, etc.). The measurement data can be output as the user-emulated measurement data 242 in a predetermined format that can be parsed and processed by the test system 114. An example format uses a JSON data structure having key-value pairs. Each key-value pair can include a description of the property that was measured paired with the corresponding measurement value.

The test system 114 includes a test server 212, a test engine 214, and a user interface module 216. The test server 212 includes a second processing device 220 and a monitor device management module 222. The test engine 214 includes a third processing device 230, a proxy-based server 232, storage 234 that stores a plurality of proxy-based tests 236, and memory 238. The test server 212 and test engine 214 can be integrated and share one or more components. For example, the second and third processing devices 220 and 230 can be implemented as a single processing device.

The test engine 214 has significantly more processing, short term memory, and/or long term storage resources than the individual monitor devices 108 for analyzing received user-emulated measurement data 242. For example, the third processing device 230 has significantly more processing power than the first processing device 202, memory 238 has a larger capacity than memory 206, and storage 234 provides the ability to store a large selection of proxy-based tests.

A test session can be initiated in response to a test session request received from a user via the user interface module 216 or from another processing device, such as a scheduler. The scheduler can schedule tests at regular intervals or in response to an event. For example, the scheduler can configure the test session request based on conditions, such as sensed conditions or historical patterns (e.g., of heavy network traffic). A test session can include transmission of one or more proxy-based tests, and the different proxy-based tests can use the same or different sets of selected monitor devices 108.

In the example shown, the monitor device management module 222, when executed by the second processing device 220 of the test server 212, manages the monitor devices 108. The monitor device management module 222 can select monitor devices 108 to activate for proxy testing, such as based on the test session request. In embodiments, the test server 212 can operate to perform traditional functions of managing distributed monitor devices 108, with the test engine 214 being retrofitted to the test server for providing proxy-based testing capabilities. In embodiments, the test server 212 and test engine are integrated as a single system.

The proxy-based server 232 selects one or more proxy-based test 240 from the plurality of proxy-based test 236 stored in storage 234 based on the test session request, and transmits the selected proxy-based test(s) 240 to selected monitor devices 108 for execution of the requested testing session.

The proxy-based server 232 receives from the selected monitor devices 108 user-emulated measurement data 242 that correspond to each proxy-based test transmitted to the respective monitor devices 108. The proxy-based server 232 analyzes the received user-emulated measurement data 242. The type of analysis performed can be specified by the test session request, or a default analysis can be performed.

For web browser contexts in which the server 102b is a web browser, proxy-based server 232 can include a web driver, such as Selenium® WebDriver, to drive activity via the server 102b to perform the analysis using automated web application testing, including to verify that an application operates as expected. For other contexts, such as those that use HTTP and those that do not use HTTP, an appropriate driver would be used to drive the associated activity via the proxy-based server.

The analysis can include, for example, a pre-analysis processing, core analysis processing, and/or visualization processing. The test session request can include pre-analysis, core analysis, and/or visualization instructions, which are executed by the proxy-based server 232, with results being stored in storage 234.

The pre-analysis instructions may specify, for example, fields of the user-emulated measurement data 242 to process and/or store, wherein unspecified fields of the measurement data can be ignored. For example, the selected monitor devices 108 may be virtual probes installed on a network that detect source and/or destination addresses, however the pre-analysis instructions specify processing only source address information, and ignoring destination address information. In this case, the pre-analysis processing would include filtering out the destination address information so that only the source address information will be analyzed by core analysis processing and stored, e.g., in storage 234.

Additionally, the pre-analysis instructions can include aggregation instructions. For example, the pre-analysis instructions can specify a statistical aggregation that includes determining a minimum, maximum, mean, 3 dB level, or 6 dB level per a specified interval, wherein the interval can be specified as a time or frequency interval. The results of the pre-analysis can be stored (e.g., in storage 234) rather than, or in addition to, the raw user-emulated measurement data 242.

The core analysis instructions can specify, for example, particular fields of the measurement data to process and mathematical and/or statistical algorithms to use for processing the measurement data. The core analysis instructions can further specify alert conditions associated with the user-emulated measurement data 242 and/or pre-analysis or core analysis results. When an alert condition is detected, an alert indicator, such as a visual, audio, or vibratory indicator, can be output to a user.

Core analysis processing may involve timing measurements associated with interactions between the monitor devices 108 and the servers 102b being monitored based on user-emulated actions performed by the monitor devices 108. However, latency caused by processing by the monitor devices 108 or the test system 114 and transmission of signals between the test system 114 and the monitors 108 transmitted between would skew timing measurements used by the core analysis. Accordingly, the monitor devices 108 and/or the proxy-based server 232 can compensate for latency caused by the monitor devices 108 and the test system 114 and communication there between. Compensation for latency can be done naively, by subtracting a predetermined (e.g., empirically determined) latency between the proxy-based server and the test system, or can be done with higher fidelity by timestamping each interaction as seen by the proxy-based server and determining latency associated with each interaction.

The visualization instructions can specify, for example, which user-emulated measurement data 242 or analysis (pre-analysis or core analysis) results to display, how to display them, which graphical characteristics to use (e.g., graph types, layout, color), and which numerical statistics to display (e.g., max, min, mean).

Accordingly, although conventional monitor devices are limited to measuring network data as is, with only limited resources to process resultant measurement data, a plurality of distributed monitor devices 108 can be selected and configured to emulate user actions associated with a selected server and perform a variety of different proxy-based tests. The resource intense test system 114 analyzes interactions between the user-emulating monitor device 108 and the server, thus emulating end-to-end performance of the server, with the ability to test a large range of aspects of services provided by the server, including those that rely on external dependencies.

The user interface module 216 can receive user input data by interfacing with user input devices, such as a keyboard, pointing device (e.g., mouse), touch screen, etc. Additionally, the user interface module 216 interfaces with user output devices, such as a display monitor, audio speakers, vibration devices, and/or a printer, for outputting visualizations of data (user-emulated measurement data 242 or analysis (pre-analysis or core analysis) results) and alarms to a user. Thus, the user interface module 216 provides an interface for exchanging data between a user and the test system 114.

The first, second, and third processing devices 202, 220, and 230 can include, for example, a field-programmable gate array (FPGA), application specific integrated circuit (ASIC), microcontroller, microprocessor, or the like. The processing devices 202, 220, and 230 can include firmware and/or hardware for executing software modules configured to perform the operations in accordance with the disclosure.

Figure 3:
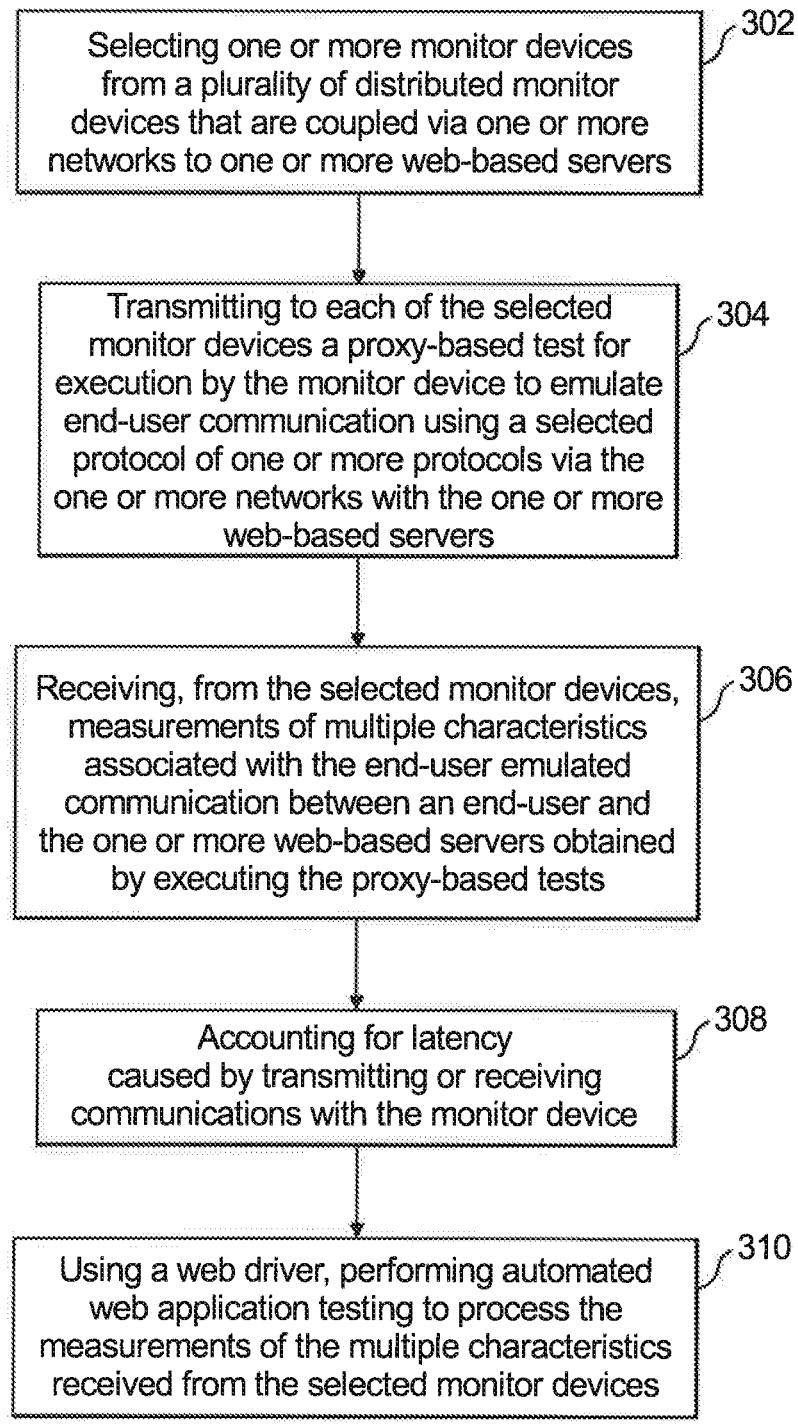
FIG. 3 illustrates a flowchart showing an example method performed by the test system in accordance with embodiments of the disclosure.
Figure 4:
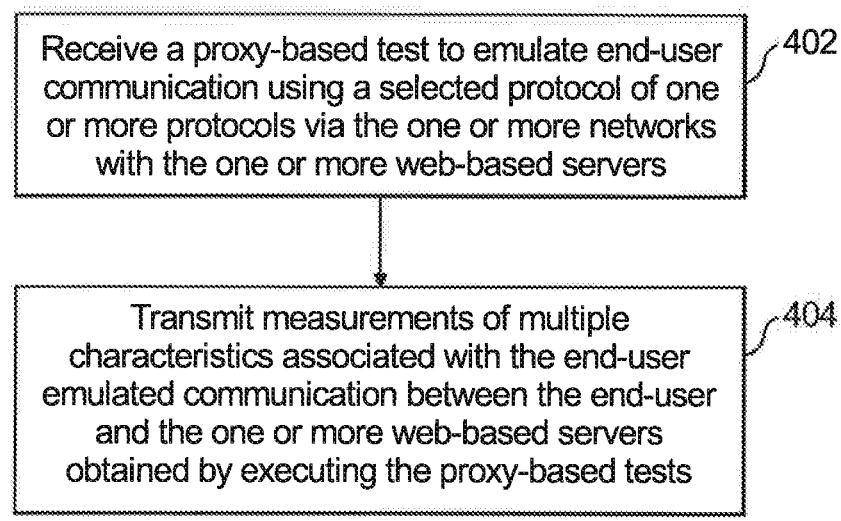
FIG. 4 illustrates a flowchart showing an example method performed by a test monitor in accordance with embodiments of the disclosure.

With reference now to FIGS. 3 and 4, shown are flowcharts demonstrating implementation of the various exemplary embodiments. It is noted that the order of operations shown in FIGS. 3 and 4 is not required, so in principle, the various operations may be performed out of the illustrated order or in parallel. Also certain operations may be skipped, different operations may be added or substituted, or selected operations or groups of operations may be performed in a separate application following the embodiments described herein.

FIG. 3 shows an example method to test end-to-end performance of a server, as performed by a test system, such as test system 114 shown in FIG. 1. At operation 302, one or more monitor devices are selected from a plurality of distributed monitor devices that are coupled via one or more networks to one or more web-based servers. At operation 304, a proxy-based test is transmitted to each of the selected monitor devices for execution by the monitor device to emulate end-user communication using a selected protocol of one or more protocols via the one or more networks with the one or more web-based servers. At operation 306, user-emulated measurement data is received from the selected monitor devices. In embodiments, the user-emulated measurement data can include measurements of multiple characteristics associated with the end-user emulated communication between an end-user emulated by the selected monitor devices and the one or more web-based servers obtained by executing the proxy-based tests. In embodiments, the user-emulated measurement data can include intercepted network traffic that is responsive to the end-user communication. At operation 308, processing is performed to account for latency caused by transmitting or receiving communications with the monitor device. At operation 310 using a web driver, automated web application testing is performed to process the measurements of the multiple characteristics received from the selected monitor devices.

FIG. 4 shows a method to test of end-to-end performance of a server, as performed by a monitor device, such as monitor device 108 shown in FIG. 1. At operation 402 a proxy-based test is received from a test system, wherein the proxy-based test is configured to emulate end-user communication using a selected protocol of one or more protocols via the one or more networks with the one or more web-based servers. At operation 404 the received proxy-based tests are executed. This can include emulating end-user communication, such as transmitting end-user emulated requests to a selected server, such as server 102b shown in FIG. 1, or transmitting responses to transmissions from the selected server. At operation 406 processing is performed to account for latencies associated with communication with the test system. At operation 408, user-emulated measurement data is transmitted. The user-emulated measurement data can include, for example, measurements of multiple characteristics associated with the end-user emulated communication with the selected server obtained by executing the proxy-based test or intercepted network traffic that is responsive to the user-emulated communication directed at the selected server that is being tested.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments processing performed by monitor device 108 and test system 114 may be implemented or executed by one or more computer systems. For example, processing performed by monitor device 108 and test system 114 can be implemented using a computer system such as example computer system 502 illustrated in FIG. 5. In various embodiments, computer system 502 may be a server, a mainframe computer system, a workstation, a network computer, a desktop computer, a laptop, or the like, and/or include one or more of a field-programmable gate array (FPGA), application specific integrated circuit (ASIC), microcontroller, microprocessor, or the like.

Computer system 502 is only one example of a suitable system and is not intended to suggest any limitation as to the scope of use or functionality of embodiments of the disclosure described herein. Regardless, computer system 502 is capable of being implemented and/or performing any of the functionality set forth hereinabove.

Computer system 502 may be described in the general context of computer system-executable instructions, such as program modules, being executed by a computer system. Generally, program modules may include routines, programs, objects, components, logic, data structures, and so on that perform particular tasks or implement particular abstract data types. Computer system 502 may be practiced in distributed data processing environments where tasks are performed by remote processing devices that are linked through a communications network. In a distributed data processing environment, program modules may be located in both local and remote computer system storage media including memory storage devices.

Figure 5:
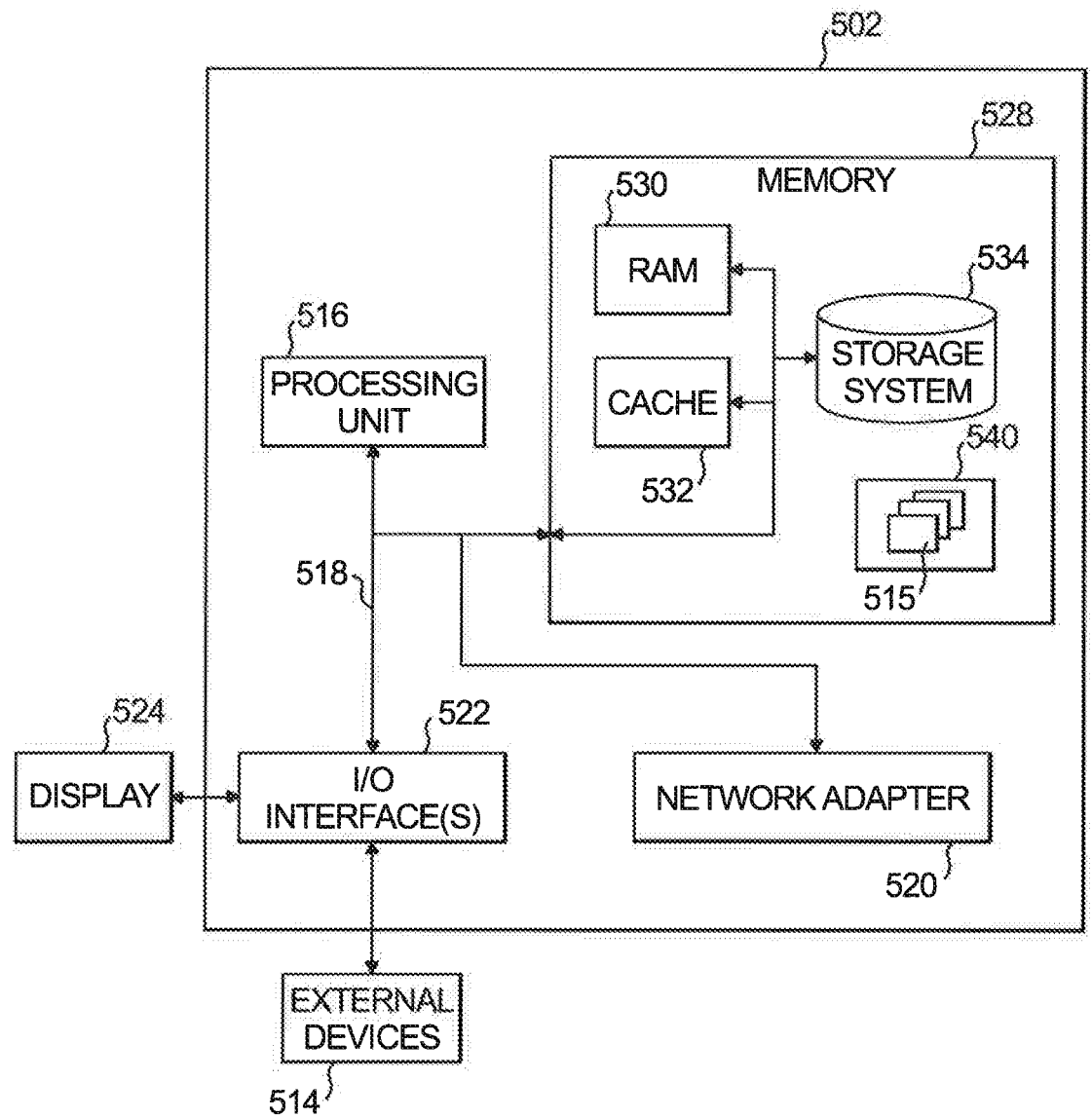
FIG. 5 illustrates a schematic block diagram of an example analysis system, in accordance with an illustrative embodiment of the present disclosure.

Computer system 502 is shown in FIG. 5 in the form of a general-purpose computing device. The components of computer system 502 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 502 typically includes a variety of computer system readable media. Such media may be any available media that is accessible by the monitor device 108 or test system 114, and it includes both volatile and non-volatile media, removable and non-removable media.

System memory 528 can include computer system readable media in the form of volatile memory, such as random access memory (RAM) 530 and/or cache memory 532. Computer system 502 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the disclosure.

Program/utility 540, having a set (at least one) of program modules 515, such as the user emulation module 210, monitor device management module 222, proxy-based server 232, and user interface module 216, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 515 generally carry out the functions and/or methodologies of embodiments of the disclosure as described herein.

Computer system 502 may also communicate with one or more external devices 514 such as a keyboard, a pointing device, a display 524, etc.; one or more devices that enable a user to interact with computer system 502; and/or any devices (e.g., network card, modem, etc.) that enable the monitor device 108 or test system 114 to communicate with one or more other computing devices. Such communication can occur via Input/Output (I/O) interfaces 522. Still yet, computer system 502 can communicate with one or more networks such as a local area network (LAN), a general wide area network (WAN), and/or a public network (e.g., the Internet) via network adapter 520. As depicted, network adapter 520 communicates with the other components of the monitor device 108 or test system 114 via bus 518. It should be understood that although not shown, other hardware and/or software components could be used in conjunction with computer system 502. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Potential advantages provided by the disclosed method and system include the ability to administer test sessions across selected distributed monitor devices that are configured to emulate selectable user actions directed at a selected server and perform a variety of selectable proxy-based tests, allowing for testing and analysis of end-to-end performance. Since the test session storage, test session selection, and analysis of the intercept data is performed on a resource intense platform, instead of by the resource restricted monitor devices, complicated analysis can be performed that requires more resources than are available on the monitor devices. Testing of a service provided by a server can include testing aspects that rely on multiple external dependencies. Additionally, the test sessions can be selected from a large selection of test sessions that test a large array of services, protocols, and aspects of services.

The techniques described herein are exemplary, and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof.

Although the systems and methods of the subject disclosure have been described with respect to the embodiments disclosed above, those skilled in the art will readily appreciate that changes and modifications may be made thereto without departing from the spirit and scope of the certain illustrated embodiments as defined by the appended claims.

The invention claimed is:

1. A computer implemented method comprising:
transmitting from a processing device of a remote test system, to a plurality of monitor devices, a proxy-based test for execution by at least one of the plurality of monitor devices to emulate end-user communication using a protocol via one or more networks with a web-based server coupled to the plurality of monitor devices wherein the proxy-based test includes transmitting end-user emulated requests to a selected server or transmitting responses to transmissions from a selected server;
receiving, and aggregating, by an aggregation device, the responses by the web-based server to the proxy-based test from each of the plurality of monitor devices wherein the aggregation device is located remotely from each of the plurality of monitor devices;
receiving by the processing device, from the aggregation device, responses by the web-based server to the proxy-based test; and
performing by the processing device automated web application testing to measure characteristics of communication between at least one of the plurality of monitor devices, via the aggregation device, and the web-based server, the communication including user-emulated messages from at least one of the plurality of monitor devices executing the proxy-based test to the web-based server and corresponding responses from the web-based server, wherein the proxy-based tests transmitted to different monitor devices of the selected monitor devices emulate the end-user emulated communication using different respective protocols.

2. The computer implemented method of claim 1 further comprising:
selecting at least one monitor device from a plurality of distributed monitor devices that are coupled via the one or more networks to the web-based server, wherein the proxy-based test causes the at least one monitor device to measure multiple characteristics associated with the emulated end-user communication between the end-user and the web-based server.

3. The computer implemented method of claim 2, wherein the method further includes receiving measurement data from one of the plurality of monitor devices indicative of measurements of the multiple characteristics obtained by one of the plurality of monitor devices when executing the proxy-based test.

4. The computer implemented method of claim 1, wherein the automated web application testing uses a web driver.

5. The computer implemented method of claim 1, further comprising accounting for latency caused by transmitting or receiving communications with at least monitor device from the plurality of monitor devices.

6. The computer implemented method of claim 3, wherein the proxy-based test includes a user-emulated request to the web-based server, and wherein the measurement data received is based on the user-emulated request and user-emulated receipt of a response of the web-based server to the user-emulated request.

7. The computer implemented method of claim 1, wherein the protocol enables communication with single page application web pages and the web-based server services the single page application web pages.

8. The computer implemented method of claim 1, wherein the protocol is at least one of HTTP and FTP.

9. A test system to test end-to-end performance of a server, the test system comprising:

a memory configured to store instructions;
a processor disposed in communication with the memory, wherein the processor upon execution of the instructions is configured to:
   transmit, to a plurality of monitor devices, a proxy-based test for execution by at least one of the plurality of monitor devices to emulate end-user communication using a protocol via one or more networks with a web-based server coupled to at least one monitor device of the plurality of the monitor devices wherein the proxy-based test includes transmitting end-user emulated requests to a selected server or transmitting responses to transmissions from a selected server;
   receive, from an aggregation device coupled to each of the plurality of monitor devices responses by the web-based server to the proxy-based test from each of the plurality of monitor devices wherein the aggregation device is located remotely from each of the plurality of monitor devices;
   perform automated web application testing to measure characteristics of communication between at least one of the plurality of monitor devices, via the aggregation device, and the web-based server, the communication including user-emulated messages from at least one of the plurality of monitor devices executing the proxy-based test to the web-based server and corresponding responses from the web-based server, wherein the proxy-based tests transmitted to different monitor devices of the selected monitor devices emulate the end-user emulated communication using different respective protocols.

10. The test system of claim 9, wherein the processor, upon execution of the instructions, is further configured to select at least one monitor device from a plurality of distributed monitor devices that are coupled via the one or more networks to the web-based server, wherein the proxy-based test causes the at least one monitor device to measure multiple characteristics associated with the emulated end-user communication between the end-user and the web-based server.

11. The test system of claim 10, wherein the processor, upon execution of the instructions, is further configured to receive measurement data from at least one monitor device of the plurality of monitor devices indicative of measurements of the multiple characteristics obtained by the at least one monitor device when executing the proxy-based test.

12. The test system of claim 9 wherein the processor, upon execution of the instructions, is further configured to account for latency caused by transmitting or receiving communications with at least one monitor device from the plurality of monitor devices.

13. The test system claim 9, wherein the proxy-based test includes a user-emulated request to the one or more web-based servers, and wherein the measurements received are based on the user-emulated request and user-emulated receipt of a response of the one or more web-based servers' response to the user-emulated request.

14. The test system of claim 9, wherein the protocol enables communication with single page application web pages and the one or more web-based servers service the single page application web pages.

15. A non-transitory computer readable storage medium and one or more computer programs stored therein, the computer programs comprising instructions, which when executed by a computer system, cause the computer system to:
   transmit, to a plurality of monitor devices, a proxy-based test for execution by at least one monitor device of the plurality of monitor devices to emulate end-user communication using a protocol via one or more networks with a web-based server coupled to at least one monitor device of the plurality of the monitor devices wherein the proxy-based test includes transmitting end-user emulated requests to a selected server or transmitting responses to transmissions from a selected server;
   receive, and aggregate, by an aggregation device, the responses by the web-based server to the proxy-based test from each of the plurality of monitor devices wherein the aggregation device is located remotely from each of the plurality of monitor devices; and
   receive, from the aggregation device, monitor device responses by the web-based server to the proxy-based test;
   perform automated web application testing to measure characteristics of communication between at least one monitor device from the plurality of monitor devices and the web-based server, via the aggregation device, the communication including user-emulated messages from at least one monitor device from the plurality of monitor devices executing the proxy-based test to the web-based server and corresponding responses from the web-based server, wherein the proxy-based tests transmitted to different monitor devices of the selected monitor devices emulate the end-user emulated communication using different respective protocols.

16. The non-transitory computer readable storage medium of claim 15, wherein the computer system, upon execution of the instructions, is further caused to:
   select at least one monitor device from a plurality of distributed monitor devices that are coupled via the one or more networks to the web-based server, wherein the proxy-based test causes the at least one monitor device to measure multiple characteristics associated with the emulated end-user communication between the end-user and the web-based server; and
   receive measurement data from the at least one monitor device indicative of measurements of the multiple characteristics obtained by the at least one monitor device when executing the proxy-based test.

17. The non-transitory computer readable storage medium of claim 15, wherein the computer system, upon execution of the instructions, is further caused to account for latency caused by transmitting or receiving communications with at least one monitor device from the plurality of the monitor devices.

* * * * *